June 10, 1941.                T. WISNIEWSKI                2,245,061
FISH LURE
Filed June 14, 1939
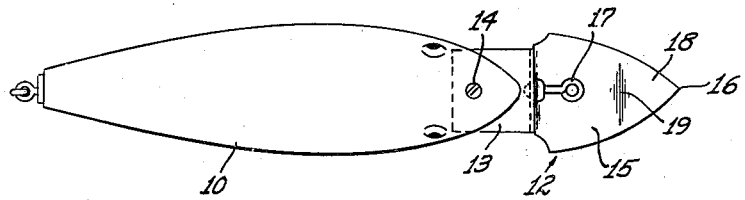
Fig. 1
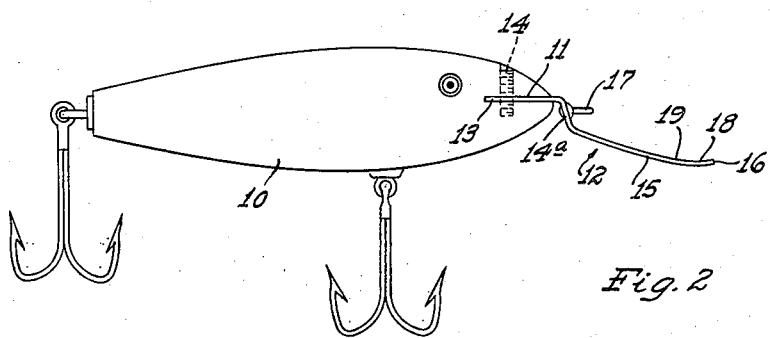
Fig. 2
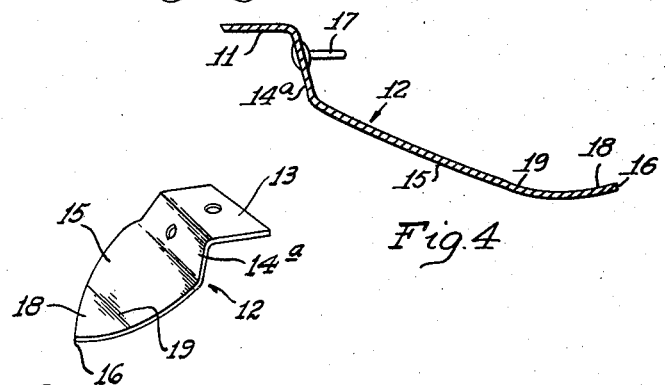
Fig. 4
Fig. 3
Inventor
THEODORE WISNIEWSKI.
By Wallace P. Lamb
Attorney Patented June 10, 1941

2,245,061

UNITED STATES PATENT OFFICE 2,245,061

FISH LURE

Theodore Wisniewski, Detroit, Mich.

Application June 14, 1939, Serial No. 279,143

5 Claims. (Cl. 43—46)

This invention relates generally to artificial fish bait and more particularly to a lip for a plug.

It is an object of the present invention to provide a so-called plug which, when drawn through the water, will rapidly wiggle in a manner to give very realistically the appearance of a live fish.

Another object of the invention is to provide a new and improved lip for a plug so constructed as to give the plug a natural wiggle movement when drawn through the water and also to keep the plug level and below water surface without need of sinkers.

In the accompanying drawing to be taken as a part of this specification, I have fully and clearly illustrated a preferred embodiment of the invention, in which drawing—

Fig. 1 is a top plan view of my artificial fish bait.

Fig. 2 is a side view of the bait and

Fig. 3 is a perspective view of my improved lip for a bait or plug.

Fig. 4 is an enlarged view of the lip shown in longitudinal section.

Referring to the drawing by characters of reference, the numeral 10 designates in general a plug which may be of any suitable type and in the lead or forward end of the plug is provided a slot 11 to receive a lip member 12. This lip member includes a base portion 13 which fits into the slot 1; the plug and the lip base portion 13 being provided with aligning apertures to receive a screw 14 by means of which the lip 12 may be secured to the plug 10. The lip 12 projects forwardly of the plug and is provided with a downward offset or step 14a from which the lip continues forward, the forward portion, as at 15, being curved downwardly, as seen in the side view of Fig. 2. This lip member 12 can be easily and economically made of sheet metal. As seen in the plan view of Fig. 1, the lip is elongated or is considerably longer than it is wide and the side edges of the forward portion 15 curve inwardly, preferably to a point 16. In order to effect a rapid wiggling of the bait, the end portion or tip 8 is bent upwardly as indicated at 19. In the step portion 14a, an eyelet 17 may be provided for the attachment of a line (not shown).

While I have herein described in detail a specific embodiment of my invention which I deem to be new and advantageous and may specifically claim, it will be apparent that changes may be made therein without departing from the spirit or scope of my invention.

What I claim and desire to secure by Letters Patent of the United States is:

1. A lip for a fish lure comprising, a base portion for attachment to a plug, a forward portion, and an upturned end portion adjacent said forward portion.

2. A lip for a fish lure comprising, a base portion, a forward portion integral with said base portion, a lead end integral with said forward portion, said forward portion curving forwardly and downwardly toward said lead end and having a relatively large radius of curvature, said forward portion being bent transversely anterior to said lead end and curving upwardly at a relatively small radius of curvature to said lead end.

3. A lip for a fish lure comprising, a base portion for attachment to a plug, a lip portion joined to said base portion, said lip portion curving forwardly and downwardly of said base portion and being bent transversely providing a turned up tip portion.

4. A lip for a fish lure comprising, a base portion for attachment to a plug, a lower portion joined to said base portion, said lower portion extending forwardly of said base portion and having an upper surface of relatively large curvature, and an upturned tip portion joined to and extending forwardly of said lower portion, said tip portion having an upper surface of small curvature relative to the curvature of the upper surface of said lower portion.

5. A lip for a fish lure comprising, a base portion for attachment to a plug, a step portion joined to the base portion, said step portion extending downwardly and forwardly from said base portion, a forward portion joined to said step portion below said base portion and curving forwardly from said step portion, and an upturned tip portion to effect a rapid wiggling of the plug when pulled through the water, said tip portion joining said forward portion in such a manner as to form a transverse bend in the lip.

THEODORE WISNIEWSKI.